E. B. STARR AND H. E. MARSH.
METHOD AND APPARATUS FOR CUTTING BRICKS OR BLOCKS FROM NATURAL DEPOSITS.
APPLICATION FILED JAN. 20, 1920.
1,353,188. Patented Sept. 21, 1920.
2 SHEETS—SHEET 1.
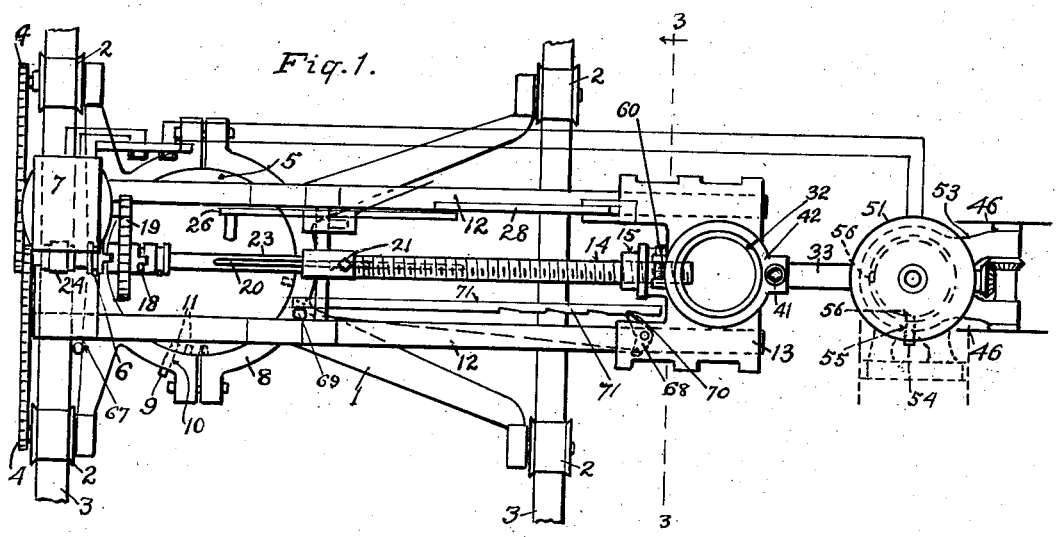
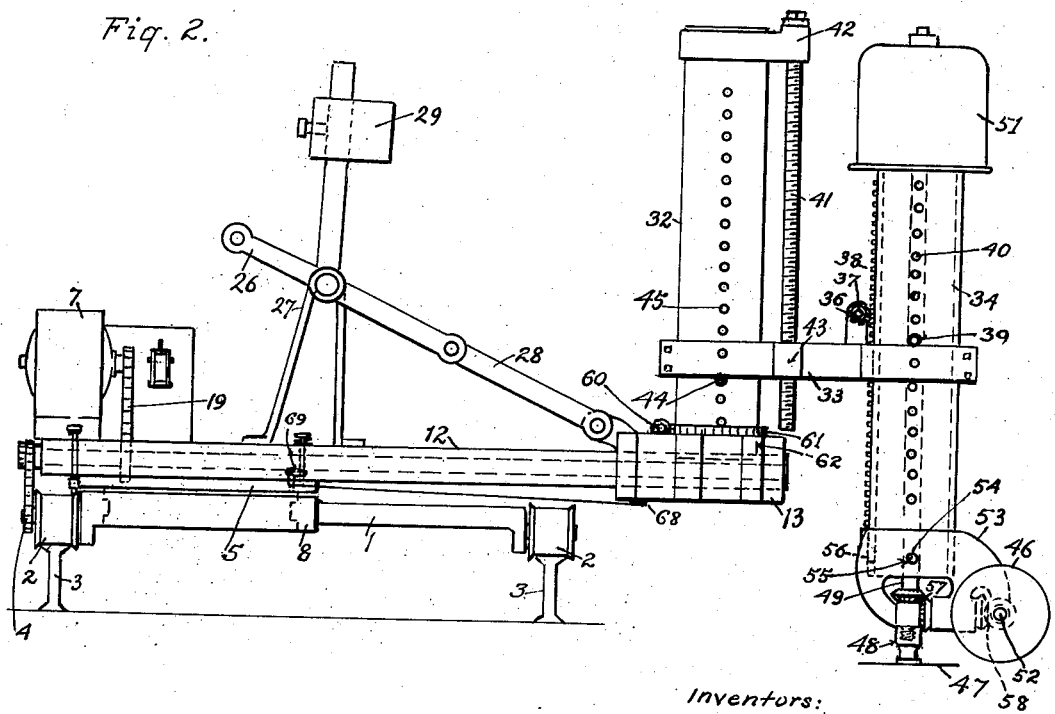
Inventors:
Edward B. Starr
Howard E. Marsh
by Arthur P. Knight
atty

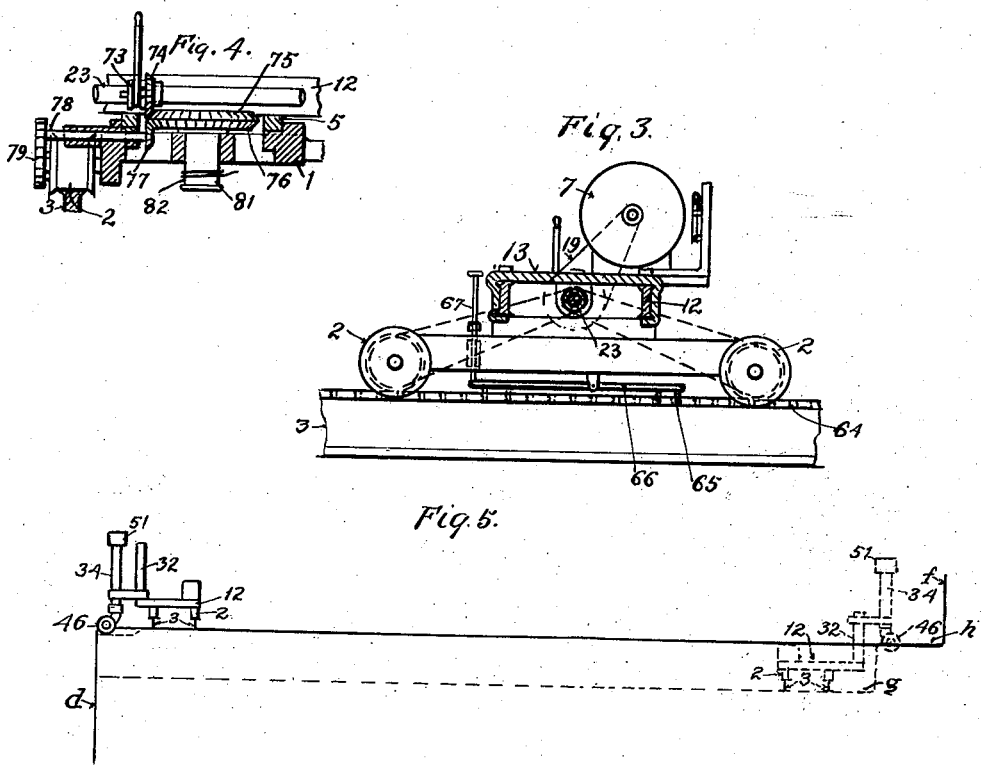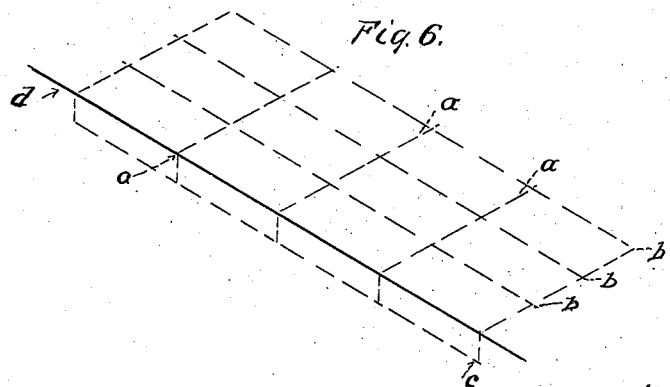

UNITED STATES PATENT OFFICE.

EDWARD B. STARR AND HOWARD E. MARSH, OF LOMPOC, CALIFORNIA, ASSIGNORS TO CELITE PRODUCTS COMPANY, OF LOS ANGELES, CALIFORNIA, A CORPORATION OF CALIFORNIA.

METHOD AND APPARATUS FOR CUTTING BRICKS OR BLOCKS FROM NATURAL DEPOSITS.

1,353,188. Specification of Letters Patent. Patented Sept. 21, 1920.

Application filed January 20, 1920. Serial No. 352,673.

*To all whom it may concern:*

Be it known that we, EDWARD B. STARR and HOWARD E. MARSH, citizens of the United States, residing at Lompoc, in the county of Santa Barbara and State of California, have invented a new and useful Method and Apparatus for Cutting Bricks or Blocks from Natural Deposits, of which the following is a specification.

This invention relates to the art of sawing or cutting bricks or blocks from natural beds or deposits of kieselguhr, or other material which is sufficiently uniform and soft in texture to enable such operation, and the main object of the invention is to provide for performing this operation with greater speed and economy than has heretofore been possible.

The accompanying drawings illustrate an apparatus suitable for carrying out our invention, and referring thereto:

Figure 1 is a plan view of the apparatus;

Fig. 2 is a side elevation thereof;

Fig. 3 is a section on line 3—3 in Fig. 1;

Fig. 4 is a side elevation of a modified traction device for the truck carrying the cutters;

Fig. 5 is a diagrammatic section of the bed of material in process of being cut according to our improved method;

Fig. 6 is a perspective showing the manner in which the successive cuts are made.

The apparatus shown in the drawing comprises a truck or vehicle having a frame 1, mounted on wheels 2 adapted to travel on track rails 3, and provided with suitable means for moving it along the track and with means movably mounted on the truck frame to support the cutting devices. We have shown a drive connection, including a gearing 4 and a clutch 6, from a driving electric motor 7 to the truck wheels 2 for moving the apparatus along the track, but any other suitable means may be used, for example, cable traction may be used for this purpose. A turn table 5 is mounted to turn horizontally on bearing 8 on frame 1 and is held in any desired angular position by means of a pin 9 engaging in a hole 10 in said bearing and in any one of a plurality of holes 11 in the turn table. Rails 12 mounted on said turn table form a track or way on which slides a carrier or cross-head 13 for holding the cutting devices, said carrier being moved in and out by suitable means, for example, by a lead screw 14 engaging in a nut 15 on said carrier and operated by motor 7, through clutch 18 and gearing 19. We also prefer to provide for direct manual control of the carrier feed when desired and for this purpose the lead screw 14 is made hollow and slides on a shaft 23 mounted to turn in bearing 24 on the turn table 5, said shaft being connected to said screw by spline 20 and being normally keyed to the screw by a bolt 21, so that by loosening this bolt the screw can slide freely on the shaft 23 and the carrier 13 may then be moved in or out by a hand lever 26 pivoted on a standard 27 and connected by link 28 to said carrier; a counterweight 29 being provided, if desired, for aiding the inward movement when the saws are being forced into the bed of material being cut, as hereinafter described. Cross-head 13 carries a vertical post 32 from which extends a bracket or arm 33 having mounted therein for vertical adjustment a vertical member 34 (formed preferably as a tube) carrying the cutting tools or saws. The vertical adjustment of member 34 may be effected by a pinion 36 mounted on arm 33 and engaging a rack 38 on the member 34, the shaft of said pinion having a squared part 17 to receive a handle for turning the same to raise or lower said member, the latter being retained in adjusted position by means of a pin 39 fitting in any one of a series of holes 40 and engaging with the top of arm 33. We also prefer to provide for vertical adjustment of the arm 33 on post 32, for example, by means of a vertical screw 41 mounted to turn in a bearing 42 on post 32 and engaging in a nut portion 43 of said arm, the parts being accurately adjusted and locked by means of a pin 44 fitting in any one of a series of holes 45 in post 32 and engaging with the bottom of arm 33.

The cutting devices comprise vertical saws 46 here shown as two in number although any desired number may be used, and a horizontal saw 47. The horizontal saw 47 is mounted removably by a coupling 48 on the lower end of a vertical shaft 49 journaled in bearings in the vertical member 34 and rotated by an electric motor 51 directly connected thereto. The vertical saws 46 are carried on a cross shaft 52 journaled in a bracket 53 mounted on the lower end of member 34, preferably in such manner as to be rotatable thereon, suitable means, such as a pin 54 fitting in hole 55 in bracket 53 and in one of a plurality of holes 56 in the member 14 being provided for setting the saws 46 in positions parallel to the line of motion of sliding cross-head 13, or at right angles to such position. The vertical saws 46 may be driven by gear connection 57 and 58 from the shaft 49 aforesaid. The angular position of post 32 may be adjusted or varied by means of a worm 60 mounted on carrier 13 and engaging a worm wheel 61 on said post, the latter being mounted to turn in a bearing 62 to bring the cutting saws to any desired position in front of or on either side of the cross-head.

Suitable means are preferably provided for gaging the position of the cutting parts. For example, the track rails 3 may be provided with a series of holes 64 formed, preferably, as elongated slots in the tread of one of said rails and adapted to receive pins 65 on a locking lever 66, pivoted to a frame 1 and operated by suitable pedal means 67 to release pins 65 from the holes 64 in the track rails or to allow the pins to enter said holes, so as to hold the cutting apparatus in fixed position on the track, the holes 64 being spaced apart, for example, a distance equal to the length of the brick to be cut. The position of the sliding member 13 is gaged by a dog 68 on said member operated by a pedal lever 69 and adapted to engage any one of a series of notches 70 on a bar 71, the spacing of said notches being equal, for example, to the width of the brick to be cut. The vertical adjustment of the cutters is determined by the spacing of holes 45 which is equal, for example, to the thickness of the brick.

The above described apparatus may be used as follows, in cutting brick from a natural deposit, or "bank," of kieselguhr, or similar material, indicated at $d$ in Figs. 5 and 6. The track rails 3 are laid parallel to the edge of the bank but far enough away therefrom to permit of the cutting of a series of courses of brick between the track and the edge, as indicated in full lines in Fig. 5. The machine is placed on the track and suitable connections to an electric circuit are made to drive the motors 7 and 51. The first operation to be performed is to cut a series of slits or kerfs, as indicated at $a$ in Fig. 6, extending inwardly from the edge of the bank to a distance corresponding to the total width of the courses to be cut at this operation. For this purpose, the horizontal saw 47 is removed from the shaft 49 and the bracket 53 is set in position shown in full lines in Figs. 1, 2 and 5 with the vertical saws 46 extending transversely to the edge of the bank and spaced apart the length of one brick. The carrier 13 is then moved inward, either by the operation of the lead screw 14 by motor 7 through clutch 18, or by manual operation of the lever 26, so as to cause the saws 46 to move into the bank and cut two kerfs for the vertical depth of one brick and the horizontal extent of several bricks. During this operation the vehicle or truck is held in position by pins 65 on locking lever 66 engaging in holes 64 in the track rail, and when this operation is completed and the saws moved back so as to be clear of the bank, the lever 66 is operated to release the pins 65 from holes 64 and the truck then moved forward by the traction means above described, or otherwise, so as to bring the pins into the next pair of holes, the lever being released at this time so as to allow the pins 65 to slide on the track rail and fall into such holes and come to rest against the farther end of said holes, in position for retaining the truck in place for cutting the next pair of kerfs. The operation above described is then repeated so as to make additional cuts parallel to cuts $a$, this operation being repeated until the desired length along the bank has been cut in this manner. The saw carrying bracket is then turned at right angles, for example, to the position shown in dotted lines in Figs. 1 and 2, so that the vertical saws 46 are parallel to the vertical face of the bank and transverse to the cuts as just made; the horizontal saw 47 is mounted on vertical shaft 49; and the machine is propelled along the track to make cuts or kerfs $b$ and $c$ extending transversely to the cuts $a$, the cuts $b$ being spaced apart a distance equal to the width of the brick and the cut $c$ being spaced from the top of the bank a distance equal to the thickness of the brick. In this operation, one of the vertical saws 46 makes the cut $b$ (the other vertical saw being clear of the bank) and the horizontal saw 47 undercuts the brick, as indicated at $c$, preferably traveling in advance of the said vertical saw, so that the final severing of the brick is effected by the vertical saw. The first course of bricks having been cut off in this manner, a second course is cut in similar manner, and so on for as many courses as can be cut within the range of vertical movement of the member on the carrier, the member 34 being lowered for cutting each course a distance equal to the thickness of a brick and retained in lowered position by the spacing pin 39, which is placed in the appropriate hole 40 in member 34 and rests in arm 33.

It will be understood that in place of successively cutting a series of horizontal courses, as above described, a series of vertical courses may be cut, beginning at the vertical face of the bank, suitable adjustment of the machine being made for that purpose. When the bank has been cut away as far as practicable in this manner with the given setting of the track, the track may be moved over so as to enable another series of courses to be cut and so on until the track is brought close to the farther face of the bank, for example, an ascending face, as indicated at *f*. The track and machine may then be shifted to the lower level, indicated at *g*, which has just been exposed, and cutting may then proceed on the shelf *h* left by the previous operation in substantially the same manner as above set forth, the adjustment of the members being, however, changed so that the saws 46 and 47 are above the surface on which the track rails are laid.

The purpose of the turn table is to enable the carrier 13 to be turned to project the saw carrying the member 14 endwise of the machine, for example, in cutting at the end of the track, or in any other desired direction; and also to enable the saw carrier to sweep in a curved path in cutting curved brick or arch brick. The pivotal motion of post 32 on the carrier also serves for similar purposes. It will be understood that the driving means 4 shown, for the truck, would have to be disconnected when the turn table is turned away from position shown. But, if desired, a driving means, such as shown in Fig. 4, may be provided, comprising a clutch connection 73 from shaft 23 to a bevel gear 74 engaging a bevel gear 75 mounted coaxially with turn table 5 and connected by bevel gearing 76, 77 with a shaft 78, which is connected by chain gearing 79 to the traction wheels, one of which is indicated at 2. This construction permits the operation of the traction means in any position of the turn table.

If desired, the bevel gear 75 may carry a capstan 81 on which winds a cable 82 attached at its ends to suitable fixed supports to enable the machine to draw itself along.

What we claim is:

1. An apparatus for cutting bricks or blocks from banks, comprising track means, a truck adapted to travel on said track means, and cutting devices movably mounted on said truck to move transversely to the track.

2. An apparatus for cutting bricks or blocks from natural banks, comprising track means, a truck adapted to travel on said track means, and provided with a guideway transverse to the track, a carriage mounted to travel on said guideway, and cutting means carried by said carriage.

3. In an apparatus for cutting bricks or blocks from natural banks, a truck adapted to travel over such bank, a carrier mounted to slide horizontally on said truck, and a plurality of cutting devices mounted on said carrier to cut parallel kerfs in the bank.

4. In an apparatus for cutting bricks or blocks from natural banks, a vehicle adapted to travel over the bank, a carrier mounted to slide horizontally on said carrier, a horizontal shaft mounted on said carrier, a plurality of parallel vertical saws carried by said shaft, and motive means mounted on said carrier for operating said saws.

5. A bank brick cutter comprising a vehicle adapted to travel on the bank to be cut, a carrier mounted to slide horizontally on said vehicle, a member mounted for vertical movement on said carrier, and a cutter carried by said member.

6. A bank brick cutter comprising a vehicle adapted to travel on the bank to be cut, a carrier mounted to slide horizontally on said vehicle, a bracket mounted on said carrier to be angularly adjustable to different positions, a rotary saw mounted to rotate on said bracket and motive means for operating said saw.

7. In a bank brick cutter, a track provided with regularly spaced stop means, a vehicle adapted to travel on the track and provided with means for releasably engaging the stop means to stop the vehicle in definite positions, a carrier mounted to slide on the vehicle transversely to the track, and cutting means carried by said carrier.

8. In a bank brick cutter, a horizontally movable member, a vertical saw mounted on said member to rotate on a horizontal axis, a horizontal saw removably mounted on said member to rotate on a vertical axis, and means for rotating said saws.

9. In a bank brick cutter, a vertically movable member, a horizontal saw and a vertical saw rotatably mounted on said member, and means for rotating said saws.

10. In a bank brick cutter, a vehicle, a member mounted in said vehicle to move horizontally and vertically with relation thereto, vertical and horizontal saws rotatably mounted on said member, and means for rotating said saws.

11. In a bank brick cutter, a vehicle mounted to move over the bank, a carrier mounted to slide horizontally on said vehicle, a member mounted to move vertically on said carrier, a bracket mounted to turn horizontally on said member, and vertical and horizontal saws mounted to rotate on said bracket.

12. A bank brick cutter comprising a vehicle, a turn table therein, a carrier mounted to slide horizontally on said turn table, a member mounted for vertical motion on said carrier, and cutting means carried by said member.

13. A bank brick cutter comprising a vehicle, a carrier mounted to slide horizontally on said vehicle, regularly spaced stop means for holding the carrier in definite horizontally adjustable positions, and cutting devices carried by said carrier.

14. The method of cutting bricks or blocks from a bank which consists in forming a series of parallel kerfs in the bank face, and then cutting a kerf transverse to the said series of kerfs and to the said face, and a kerf parallel to the said face, to sever the bricks or blocks.

In testimony whereof we have hereunto subscribed our names this 8th day of January, 1920.

EDWARD B. STARR.
HOWARD E. MARSH.